United States Patent [19]
Fleener

[11] Patent Number: 5,752,340
[45] Date of Patent: May 19, 1998

[54] ROD ANCHOR FISHING TACKLE BOX

[76] Inventor: Edward C. Fleener, 1513 Constitution, Fort Collins, Colo. 80521

[21] Appl. No.: 708,639

[22] Filed: Sep. 5, 1996

[51] Int. Cl.$^6$ .................... A01K 97/10; F16M 13/00
[52] U.S. Cl. ............... 43/21.2; 43/54.1; 248/512; 248/520; 248/528; 248/538
[58] Field of Search .................... 43/21.2, 54.1; 248/520, 528, 538, 511, 512; 206/315.11

[56] References Cited

U.S. PATENT DOCUMENTS

| | | |
|---|---|---|
| 4,014,128 | 3/1977 | Hrdlicka ........................... 43/21.2 |
| 4,311,262 | 1/1982 | Morin .............................. 43/21.2 |
| 4,845,881 | 7/1989 | Ward .............................. 43/21.2 |
| 5,054,228 | 10/1991 | Elkins ............................. 43/21.2 |
| 5,209,009 | 5/1993 | Fast ............................... 43/54.1 |
| 5,331,761 | 7/1994 | Kuthy .............................. 43/21.2 |
| 5,414,953 | 5/1995 | Taylor ............................. 43/21.2 |
| 5,471,779 | 12/1995 | Downey ............................ 43/54.1 |
| 5,515,640 | 5/1996 | Cosby et al. ...................... 43/54.1 |

*Primary Examiner*—Michael J. Carone
*Assistant Examiner*—Theresa M. Wesson
*Attorney, Agent, or Firm*—David S. Woronoff

[57] ABSTRACT

A combination rod anchor and fishing tackle box formed of a bottom and molded top in which one or more recesses are formed in the top and a portion of each recess is threaded to receive an essentially hollow tube member which has a threaded external portion to mate with the threaded internal recesses of the top member and in which the hollow tube members are adapted to hold fishing rods firmly in place.

10 Claims, 2 Drawing Sheets

5,752,340

ROD ANCHOR FISHING TACKLE BOX

BACKGROUND OF THE INVENTION

The present invention relates to the combination fishing pole holder and tackle box for use by fisherman so that a fisherman may have one or more fishing poles deployed in actual fishing without the requirement to personally hold on to either pole. The primary purpose of the present invention is to relieve the fisherman of the necessity to hold the fishing pole at all times while fishing or to permit the fisherman to fish with more than one pole at the same time without relying on the use of more primitive means such as a rock, a hole in the ground, or some other similar "natural" device to hold one or more poles.

1. Field of the Invention

The present invention relates to the field of combination fishing tackle boxes and fishing rod holders which are used to hold the fishing rods for the fisherman in the act of actual fishing.

2. Description of the Prior Art

The closest prior art known to the applicant is shown by U.S. Pat. Nos. 4,014,128; 3,555,719; 3,327,978; and somewhat further afield 5,054,228. The first three of these patents show conventional, commercially available fishing tackle boxes with external brackets fitted thereto. The brackets are fitted to the top of the tackle box which appears to be closed with the tackle box is used to hold the fishing rod.

SUMMARY OF THE INVENTION

The present invention teaches a novel combination of a fishing tackle box and rod holder in which the front face of the top of the novel tackle box is fitted with one or more threaded receivers each receiver to accept a mating threaded sleeve which is adapted to hold a baited or unbaited fishing rod. The top of the combination tackle box-rod holder may be made of a molded material in which the threaded recesses are formed in the mold. The mating threaded sleeves may also be formed from a molded material with mating threads formed on the external surfaces thereof. A second lid acting to act as a weather shield is located inside of the molded top to seal the interior of the rod anchor-tackle box from the weather. A brace assembly formed of two leg members each hinged one to the molded top and the other to the base of the box are joined together in a partially rotatable connection in which the angle of rotation can be fixed to hold the molded top to the base at a desired angle.

DESCRIPTION OF THE PREFERRED EMBODIMENT

Figure 1:
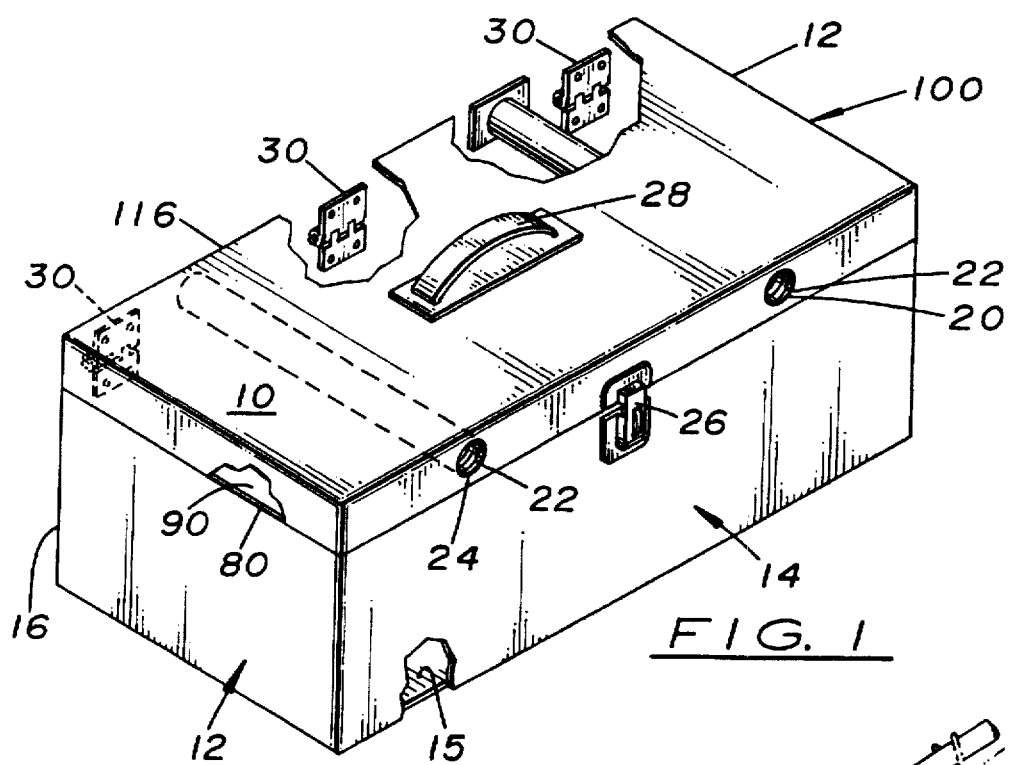
FIG. 1 shows a top perspective of one embodiment of the present invention, partially broken away.

FIG. 1 is perspective view of a first embodiment of the present invention shown generally by the number 100 is formed of a top member 10 and a base member 15. The base 15 has sides 12, a back 16 and a front 14. The base member 15 and the top member are joined for relative movement by two different sets of hinges. One set of hinges 30 are mounted on the back 16 of the base and the back 116 of the top 10. Side locking hinges shown generally by the number 39, which consist of metal legs 40, 42 which are joined together by a lockable shaft such as bolt 48 and a nut or "wing nut" 50 are joined respectively to the top 10 on rotatable shaft 46 and nut or "wing nut" 50. The top 10 has a handle 28 attached thereto to make the box 100 easy to carry. One or more locks or latch assemblies 26 also interconnect the top 10 and base 15.

A lip or edge 80 runs around the perimeter of the upper part 17 of the base 15 to permit inner lid 90 to rest thereon to provide both a storage ledge and a weather seal to the base 15 when the top 10 is open.

Figure 3:
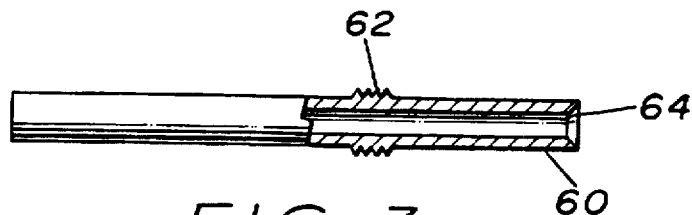
FIG. 3 shows a side view of a rod holding tube member forming a part of an embodiment of the present invention.

The top 10 may be a molded member formed on any relatively rigid material which has a hollow central portion 112 with walls 114, 116 in which a threaded portion 22 is formed. Mated to threads 22 are threads 62 formed on rod holding tube members 60 which are formed with cylindrically shaped chambers 64 for receiving and holding the handles of fishing rods (not shown). The tubes 60 are shown in more detail in FIG. 3. While the combination of the top 10 and tube engaging surfaces are described as "threaded" other engaging structures may be used such as mating frictional surfaces.

One successful embodiment of the present invention is a box about 24 inches wide and 12 inches high and twelve inches deep. Tubes 60 may be about 12 inches long and about 2 inches in diameter. The threads 62 on tubes 60 should be placed so that the tubes 60 extend 3 to 4 inches from the top 10 when threaded into top 10 receiving channels 22. When not in use, tubes 60 can be stored inside the box 100. For certain types of sport fishing the present invention should weigh about 8 pounds.

Figure 4:
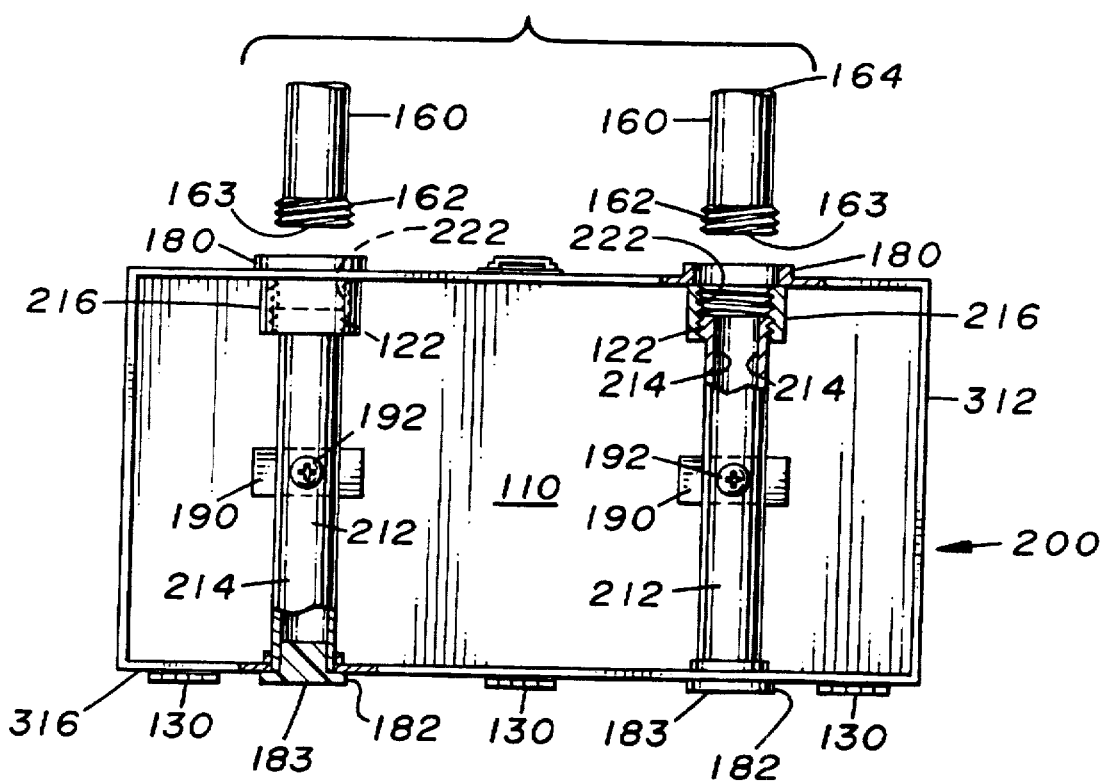
FIG. 4 shows an exploded bottom view of a part of a second embodiment of the present invention partially broken away and in section.

The second embodiment of a portion of the present invention shown in FIG. 4 generally by the number 200 is a second embodiment of a top 110 to be used with base 15 shown in FIG. 1.

Figure 2:
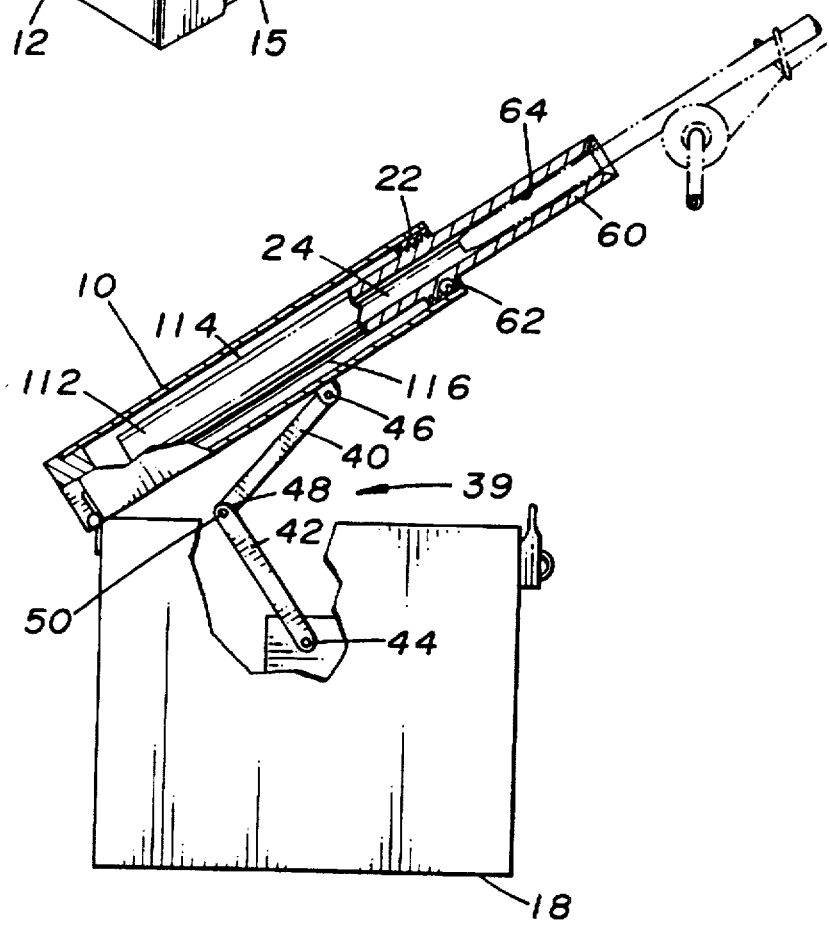
FIG. 2 is a side view of the embodiment shown in FIG. 1.

The top 110 has sides 312 and a back 316. Hinges 130 join top 110 to bottom 15, not shown in FIG. 4. A part of the locking mechanism 126 is shown in FIG. 4 which is generally similar to the lock 26 shown in FIG. 1. Tubes for holding rods 160, similar to the tubes 60 shown in FIGS. 2 and 3, have hollow side walls 164 and a threaded portion 162 nearer or at an end 163 of the tube 160. The tubes 160 are shown as pairs but there could be more or less than two tubes 160.

Second tubes 212 are fitted to the top 110 by first and second collars 216, 182. The first collars 216 have threaded portions 222 for engaging the threaded portion 162 of the rod holding tubes 160. The second tubes 212 are attached to the top by screws 192 and spaced from the top by shims 190. Collars 216 and 182 also connect the tubes 212 to top 110. Each collar 216, 182 has an outwardly extending lip 180, 183 respectively to protect the tubes 212 from external dirt or injury. The tubes may be threaded 122 to connect to the collars 216.

The embodiments of the present invention which have been shown and described are illustrative of the main principles of the invention but the following claims shall not be limited to the embodiments shown. The claims are intended to cover and do cover those variations of the invention which are apparent to those skilled in the art.

I claim:

1. A fishing rod anchor and fishing tackle box comprising in combination:

a base member having sides, a bottom, a front and a back;

a top means attached to said base member such that said top means is partially rotatable about said base member and adapted to receive rod holding members;

said top means having a front portion formed thereon;

one or more generally cylindrical recesses formed in said top means front portion;

said cylindrical recesses having means formed therein adapted for engagement;

one or more generally cylindrical rod holding tube members having means formed on the external surface thereof adapted for engagement with said cylindrical recesses engagement means; and said generally cylindrical tube member having generally cylindrical recesses formed therein for engaging a fishing rod.

2. The device claimed in claim 1 including further:

a hinge member interconnecting said top means and said base and having means thereon for locking the top means in an open position with respect to said base.

3. The device claimed in claim 1 wherein said tube member has a length and said top means has a length and wherein said tube member length and said top means length are substantially the same.

4. The claimed in claim 1 including further:

said top means engaging means comprises a spiral thread and said tube member engaging means comprises a mating spiral thread.

5. The device claimed in claim 1 including further:

an inner lip member formed inside said base member; and an inner top member adapted to rest on said lip member and to seal the inside of the box member from external objects.

6. The tackle box claimed in claim 1 wherein said base member has mass, wherein said mass is sufficient to counterbalance the mass of one or more fishing rods.

7. The tackle box claimed in claim 1 wherein:

said top means generally cylindrical recesses formed therein are formed from second tube members fixedly connected to said top means by first and second collar members.

8. The tackle box claimed in claim 7 wherein said first collar members have internally threaded portions for engaging the threaded portion of said rod holding tube members.

9. A fishing rod anchor and fishing tackle box comprising in combination:

a base member having sides, a bottom, a front and a back;

a top member attached to said base member such that it is partially rotatable about said base member and adapted to receive rod holding members;

said top member having a front portion formed thereon;

one or more generally cylindrical collars connected to said top member front portion;

one or more second tube members connected to said top member and to said generally cylindrical collars;

said cylindrical collars having means formed therein adapted for engagement;

one or more generally cylindrical rod holding tube members having means formed on the external surface thereof adapted for engagement with said cylindrical collars engagement means; and said generally cylindrical tube members having generally cylindrical recesses formed therein for engaging a fishing rod.

10. The fishing tackle box claimed in claim 9 including further:

second collar means for interconnecting said second tube members to said top means.

\* \* \* \* \*